United States Patent [19]

Inoue et al.

[11] Patent Number: 5,253,183
[45] Date of Patent: Oct. 12, 1993

[54] OBTAINING A SPECTROGRAM FROM A SINGLE SCANNING OF INTERFERENCE FRINGES

[75] Inventors: Masaru Inoue, Mito; Shigeru Matsui, Katsuta, both of Japan

[73] Assignee: Hitachi, Ltd., Tokyo, Japan

[21] Appl. No.: 803,894

[22] Filed: Dec. 9, 1991

Related U.S. Application Data

[63] Continuation of Ser. No. 292,347, Dec. 30, 1988, abandoned.

[30] Foreign Application Priority Data

Jan. 6, 1988 [JP] Japan ................................. 63-391

[51] Int. Cl.[5] ........................................... G01J 3/453
[52] U.S. Cl. ........................ 364/525; 364/571.02; 356/345; 356/319
[58] Field of Search ............... 364/525, 526, 498, 581, 364/575, 571.02; 356/346, 359, 303, 319, 326

[56] References Cited

U.S. PATENT DOCUMENTS

| | | | |
|---|---|---|---|
| 4,330,207 | 5/1982 | Nogami et al. | 364/498 |
| 4,357,673 | 11/1982 | Willis et al. | 364/575 |
| 4,590,574 | 5/1986 | Edmons et al. | 364/498 |
| 4,744,657 | 5/1988 | Araus et al. | 364/498 |
| 4,824,249 | 4/1989 | Lucas et al. | 364/498 |
| 4,901,244 | 2/1990 | Szeto | 364/481 |

OTHER PUBLICATIONS

T. H. Barnes; "Photodiode array Fourier transform spectrometer with improved dynamic range"; Applied Optics vol. 24, No. 22, Nov. 15, 1985.

Primary Examiner—Thomas G. Black
Assistant Examiner—Michael Zanelli
Attorney, Agent, or Firm—Antonelli, Terry, Stout & Kraus

[57] ABSTRACT

A device according to the present invention includes an interferometer which produces interference fringes from light received from a light source. The interference fringes are imaged onto a photo-diode array which transforms the imaged interference fringes into a single set of electric signals. The single set of electric signals is digitized and stored as a group of consecutive data points which represent an interferogram signal containing a DC component. The data points are processed to obtain moving average values representing the DC component of the interferogram signal. The moving average values are subtracted from the data points to obtain a clean interferogram signal which is Fourier-transformed to obtain a spectrogram of the light source.

36 Claims, 5 Drawing Sheets

OBTAINING A SPECTROGRAM FROM A SINGLE SCANNING OF INTERFERENCE FRINGES

This application is a continuation of application Ser. No. 292,347, filed on Dec. 30, 1988, now abandoned.

BACKGROUND OF THE INVENTION

This invention relates to a Fourier spectrophotometric device and in particular to a device for obtaining spectrum using interference fringes spatially focused.

In general, spectrum is used in qualitative analysis for investigating the kind of unknown components in a sample or in measurements for obtaining the quantity of known components, so-called quantitative analysis and indicates the relation between the wavelength or wave number and the light intensity.

As a Fourier spectrophotometric device related to this invention, a Fourier spectrophotometric device, in which interference fringes spatially focused are detected by means of a photo-diode array and for which no mechanical scanning is necessary, is described in Appl. Opt. 24 (1985) pp. 3702-3706.

By the related techniques, in order to obtain an interferogram containing no DC-component, so-called clean interferogram from interference fringes, a plane mirror in a Sagnac type common path interferometer is tilted in the vertical direction so that the interference fringes disappear, only the background (DC-component) signal is taken-out and stored; the inclination of the plane mirror stated above is adjusted suitably so as to form interference fringes; signals of an interferogram superposed on the background are measured; and the stored background signal is subtracted therefrom.

According to this method, since a plane mirror, which is a constituent of the interferometer, for which extremely severe optical adjustment is necessary, is moved mechanically, there are problems in reproducibility and reliability. Further, even if the background signal can be obtained by a method other than the mechanical method, it is necessary to scan the photo-diode array at least 2-times by means of electronic means.

SUMMARY OF THE INVENTION

The object of this invention is to provide a method for obtaining a clean interferogram containing no DC-component with only one scanning of the interference fringes without effecting such background measurement and to provide a device for realizing the method.

In order to achieve the above object, a first feature of this invention consists in that the moving average method, which is usually applied for extracting the signal component from noise, is applied for extracting the DC-component contained in the detected interference fringe signal as a noise component and only the DC-component is extracted from the interference fringe signal in which the DC-component and the signal component are superposed on each other.

A second feature consists in that the DC-component obtained by applying the moving average method is subtracted from the measured interference fringe signal so as to obtain a desired clean interferogram.

All the first and second features described above are executed by program processing.

In general, the interference fringe has a spatial frequency, which is higher than that of the background which is the DC-component. The spatial frequency means the number of bright and dark lines existing per unit length.

The background is produced, in general, in the form of a signal, whose distribution is convex upward at the central portion and varies slowly, due to differences in the transmission coefficient of a lens or characteristics of the optical system, and it can be easily imagined that it can be separated from the clean interference fringe signal by filtering.

In the background signal contained in the interference fringe signal, there is a DC light component contained in incident light and a component depending on the inter-element sensitivity difference in the photodiode array itself. The latter represents characteristics proper to the photo-diode array and it is easy to measure them in advance, using light having a uniform intensity distribution and to store them as sensitivity of each of the elements.

The primary object of this invention consists in a method for extracting the DC-component, which can vary for every measurement of an interferogram, and removing it from the interferogram.

As a method, by which noises varying with a relatively high frequency are smoothed and only slowly varying signals are taken-out, there is known the so-called moving average method, by which data at the center are deducted on the basis of data consisting of an odd number of consecutive elements, and a Savizky Golay's weighting table is used often therefor.

When an interference image signal is smoothed by the moving average method, interference signals rising and falling with small intervals are attenuated and a slowly varying DC component, i.e. background is obtained.

According to this invention, since it is possible to obtain an interference image, for which the DC component is removed and/or the intensity of the background is corrected, by using measured data obtained by only one measuring scan, the time necessary for the measurement is reduced by half, mechanically movable parts in the optical system become unnecessary, and a high reliability can be achieved.

In general, when interference signal including a DC component is Fourier-transformed, spurious oscillation waveforms appear in low wave number regions of the spectrum. As the result, the dynamic range of the operation processing device is reduced and spurious high frequency oscillation waves, which cannot be satisfactorily attenuated, are superposed on the signal in the spectral region, which is object of the measurement, which injures the quality of the spectrum.

According to this invention, since the DC component in the signals obtained by the measurement can be removed almost completely only by data processing, remarkable benefits can be obtained.

DESCRIPTION OF THE PREFERRED EMBODIMENTS

Hereinbelow an embodiment of this invention will be explained, referring to FIG. 1. Interference fringes 21 of a light source 10, which are to be measured, are imaged 31 on the surface of a photo-diode array 30 by a polarization interferometer consisting of the light source 10 to be measured, a collimator lens 12, a polarizer 15, a Wollaston prism 20, an analyzer 25 and a focusing lens 28. A light beam linearly polarized at 45° with respect to the crystal axis of the Wollaston prism 20 is obtained by the polarizer 15, which beam can be decomposed into 2 linearly polarized light waves having equal phases, whose polarization planes are perpendicular to each other. The Wollaston prism 20 is used here for decomposing an injected polarized light beam into 2 linearly polarized light beams, whose polarization planes are perpendicular to each other, with a small separation angle. The 2 separated linearly polarized light beams are combined by the analyzer 25 and an interference fringe is produced on the surface of the photo-diode array 30 due to differences between optical paths, along which they arrive at the same point thereon.

The output of the photo-diode array 30 is read out by an A/D converter 40 through a video amplifier 35 by using a clock signal 32 coming from a driving circuit not shown in the figure and inputted in an operation processing device 50 in the form of a digital signal 41. In the operation processing device 50 the signal 41 is stored in a random access memory 60 as a signal 51 either directly or after having been data-processed and is read out on occasion to be utilized again. The whole device is controlled by means of a keyboard 80 and the result is outputted on a display device 90 through an input-output interface 70.

Figure 3:
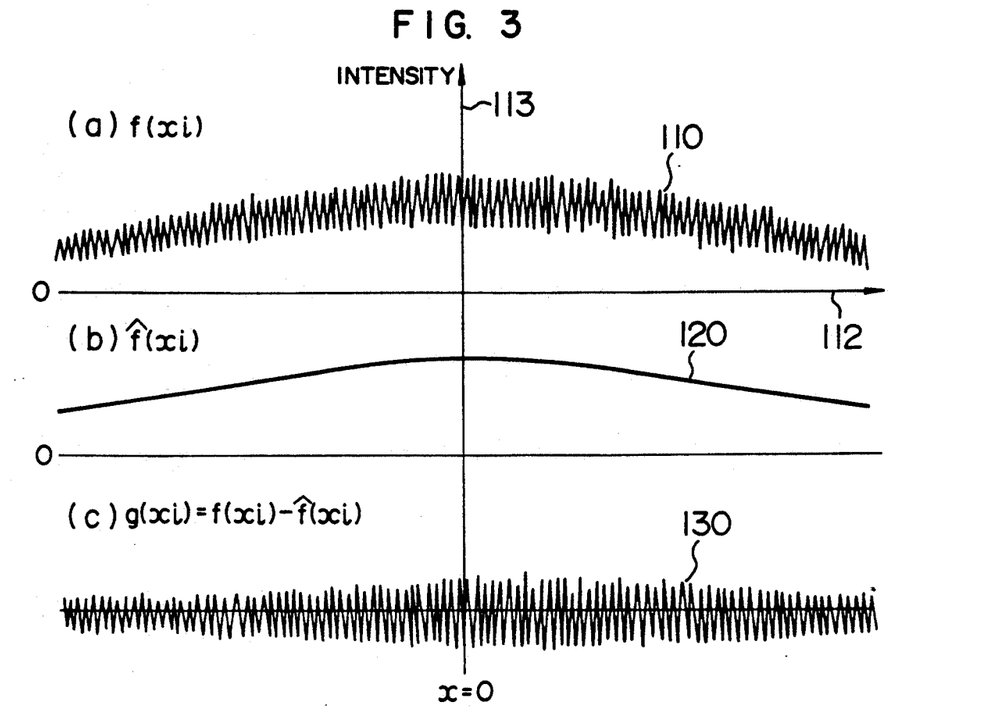
FIG. 3 shows signal waveforms before and after data processing.

Now it is supposed that an intensity signal 110, as indicated in (a) of FIG. 3, is obtained as measured data. The abscissa 112 corresponds to the number of bits N (number of elements) of the photodiode array 30, the center line 113 at x=0 corresponding to i=N/2, the two extremities corresponding to i=1 and N.

Designating the spectrum of the light source, which is to be obtained, by $B(\nu)$, the interference signal $f(x)$ can be represented by:

$$f(x) = \int_0^{\nu_m} B(\nu)(1 + a\cos 2\pi\nu x)d\nu \quad (1)$$

where $\nu_m$ is the maximum wave number of the spectrum, 1 corresponds to the DC component and a is a positive coefficient, which is smaller than 1, and which represents the contrast of the interference fringe. The wave number means the number of waves per 1 cm and it is the inverse of the wavelength. The photo-diodes are numbered and represented by i, and the pitch of the diodes calculated in terms of the interference optical path difference is designated by $\Delta x$. In this embodiment a photo-diode array 30 of N (number of elements)=1024 bits is used. Consequently, the center line of the two separated light-beams corresponds to a point of i=N/2=512 bits and the extracted optical path difference $x_i$ is as indicated by Eq. (2):

$$x_i = (i - 512)\Delta x \quad (2)$$

Measured data 110 are obtained by digitizing extracted measured values $f(i.\Delta x)$ and dealt with as a one-dimensional series of numbers $f(x_i)$ with a series of suffix numbers i.

The A/D converter 40 converts the input signal into a binary numerical value having a sufficient number of bits in synchronism with the clock signal 32, which is stored successively in the random access memory 60 under the control of the operation processing device 50.

Figure 2:
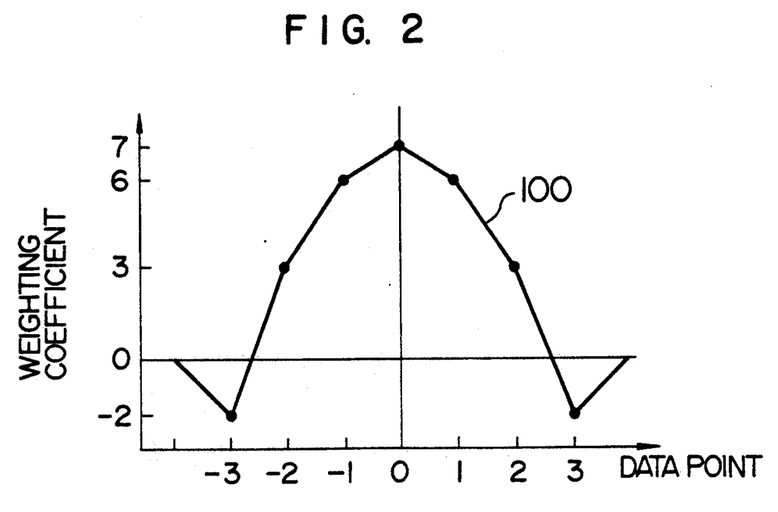
FIG. 2 is a graph indicating variations in the weighting coefficient for the moving average method.

FIG. 2 shows an example of a 7-point series of Savizky-Golay's weighting coefficients used in the moving average operation of the signal processing. Seven successive values in the one-dimensional array of numbers are multiplied by seven weighting coefficients on a curve 100, respectively, in a one-to-one correspondence, and the total sum of their products is divided by 21 in order to be normalized. The reason why the total sum is divided by 21 is that, when all of the seven elements of the data are one and they are dealt with by using the Savizky-Golay's weighting coefficients, a result, which is 21, is obtained and it is made correspondent to the original value, which is 1. The obtained value indicates the value, which is positionally at the center of the seven elements of the data and which is defined as a new value at the central point.

When the seven elements of the data, which are to be sampled, are displaced successively by one, and each time multiplied by the Savizky-Golay's weighting coefficients, respectively, so as to obtain successively new values at the central point.

The newly obtained series of numbers of the one-dimensional array represent moving averages obtained by using given weighting coefficients. This operation is called a convolution of the series of weighting coefficients and the series of numbers of the one-dimensional array.

The number of elements of the series of weighting coefficients is generally an odd number (2M + 1) where M is a positive integer so as not to give rise to any deviation due to the operation in the signal. When the odd number is great, it is possible to smooth slower variations, while the processing time increases. The deviation taking place in the signal means that, contrarily to that the new value obtained as the central value, which would be located originally at the center between the second and the third sampling points, if an even number, e.g. four, of weighting coefficients were used, is set as data at the second or third sampling point, and as the result the measured original signal is shifted towards either left or right. On the other hand, if an odd number, e.g. five, of weighting coefficients are used, the new value obtained as the central value is set at the third sampling point, which is located at the center of the sampling region. As the result, since the measured original signal is shifted towards neither left nor right, the advantage can be obtained that the fidelity to the original signal is not injured.

Figure 4:
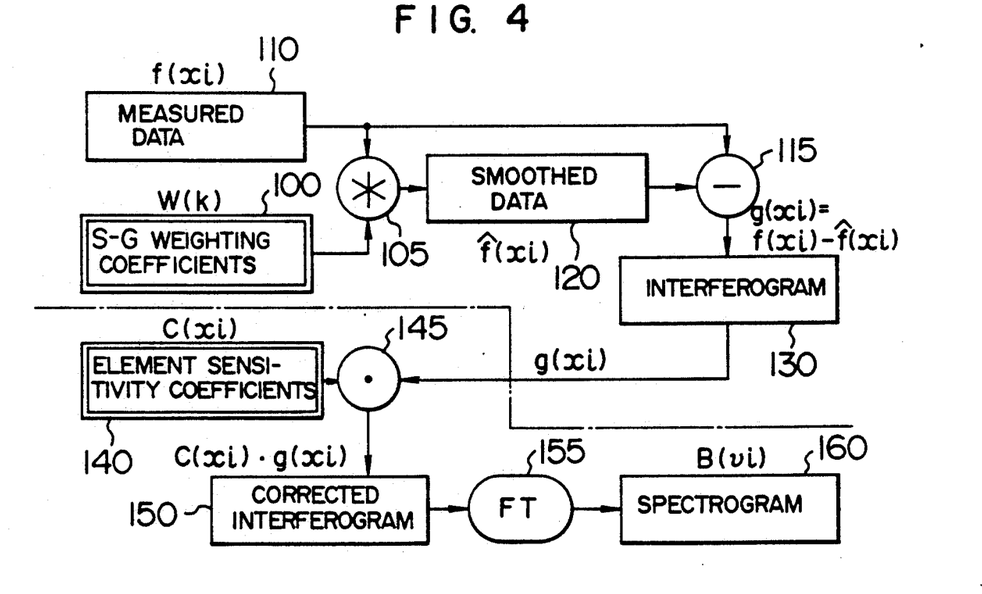
FIG. 4 is a flow chart of the data processing based on FIG. 3.

FIG. 4 shows a data flow according to this invention. The moving average and operation processing of the data are explained below, supposing that they are effected in the digital manner.

Starting from measured data 110, i.e. $f(x_i)$, data 120 smoothed by the convolution operation 105 using the weighting coefficient curve 100, i.e. W(k), is obtained. In FIG. 4 enclosures by double lines represent semi-fixed constants. On the other hand, enclosures by single lines represent variables. The contents of the enclosures are stored separately as series in numbers of one-dimensional arrays.

The measured data 110 and the smoothed data 120 are subjected to a subtraction processing 115 and interferogram 130, i.e. $g(x_i)$, indicated in (c) of FIG. 3 is outputted. They can be expressed by mathematical formulas as follows:

$$\hat{f}(x_i) = \frac{1}{P} = \sum_{k=-M}^{M} f(x_i - k) \cdot w(k) \tag{3}$$

where $$P = \sum_{-M}^{M} w(k),$$

i.e. 1/P is a normalization coefficient, and $$g(x_i) = f(x_i) - \hat{f}(x_i) \tag{4}$$

On the other hand, it can be thought that the sensitivity of an element i in the photo-diode array 30 depends on the fabrication precision of the photo-diodes, etc. and it does not vary in the usual condition. Since the output V(i), in the case where white light having a uniform illuminance distribution is projected on the photo-diode array, is proportional to the sensitivity, representing the inverse of the sensitivity by C(i), $$C(i) = \frac{1}{V(i)} \quad (i = 1, 2, \ldots, N) \tag{5}$$

are stored as sensitivity coefficients 140 i.e. $C(x_i)$, of the elements, which are a series of numbers of a one-dimensional array, and subjected to a multiplication processing 145 with the interferogram 130 stated above. As the result, a corrected interferogram 150, corrected for the inter-element sensitivity difference, is obtained and it is possible to obtain a spectrogram $B(v_j)$ of the light source by effecting a Fourier transform processing 155 such as fast Fourier transform (FFT), etc:

$$B(v_j) = FT\{C(x_i) \cdot g(x_i)\} \tag{6}$$

where FT represents a Fourier Transform and the suffix j indicates the number of the spectra elements.

The Fourier transform ideally should be carried out over an integration domain extending from $-\infty$ to $+\infty$. However, in reality a discrete Fourier transform is effected in a finite integration domain, which gives rise to spectra in the form of oscillating waves, which ideally should not exist.

In order to suppress this spurious oscillation generating phenomenon, the series of correction coefficients $C(x_i)$ are multiplied by an apodization function.

Figure 1:
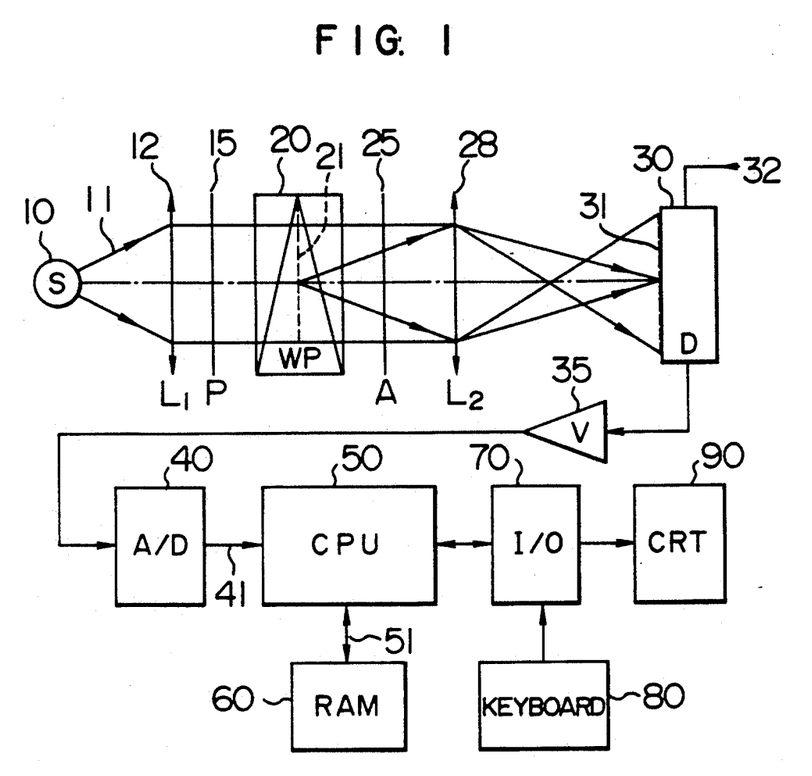
FIG. 1 is a scheme illustrating the construction of an embodiment of this invention.

The light source 10 in FIG. 1 may be either a light emitting source itself (lamp, plasma, fluorescence, etc.), which is the object of the measurement, or an output (imaginary image or real image) of an optical system such as a microscope or an extremity of optical fibers. Furthermore this invention can be applied also to light transmitted or reflected by the object of the measurement.

In this way, while the measured data 110 indicated in (a) of FIG. 3 includes a background, which is convex upward due to a high luminance at the neighborhood of the center, for the smoothed data indicated in (b) of FIG. 3 the DC component is subtracted from the measured data 110 by the moving average and the interferogram 130 indicated in (c) of FIG. 3 is obtained from the difference between (a) and (b). Consequently the interferogram 130 contains no DC component.

The operation processings 105, 115, 145, 155, etc. in FIG. 4 can be executed arbitrarily according to procedures suitably programmed within the operation processing device indicated in FIG. 1. However, the processing speed can be increased by using dedicated hardware to perform the operation processings.

Figure 5:
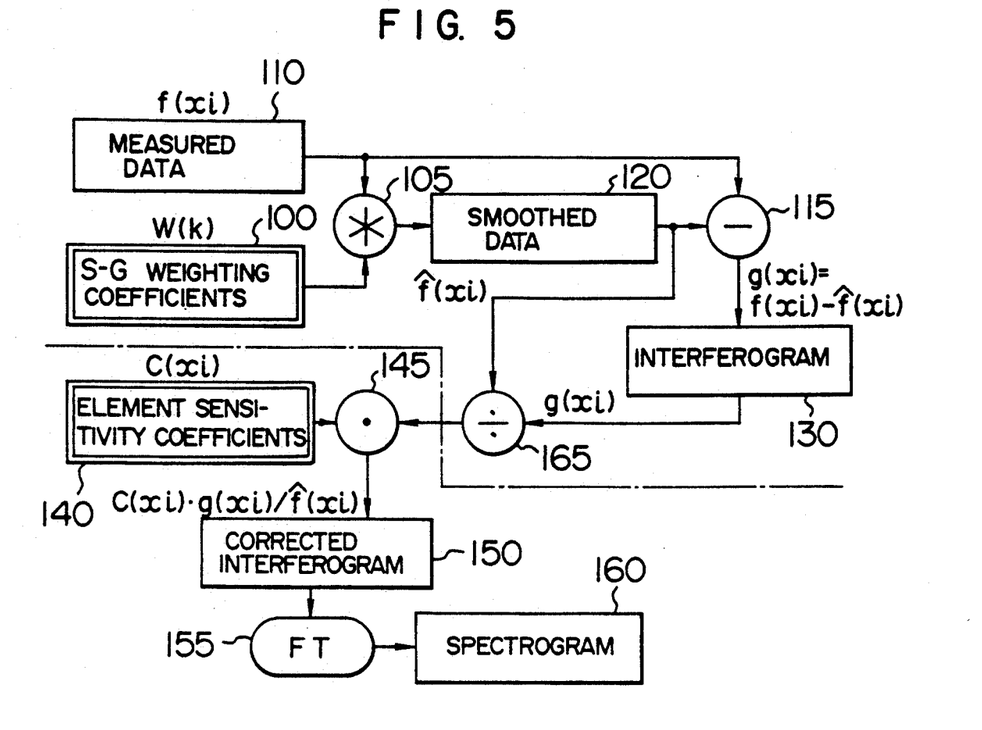
FIG. 5 is a flow chart of the data processing for another embodiment of this invention.
Figure 6:
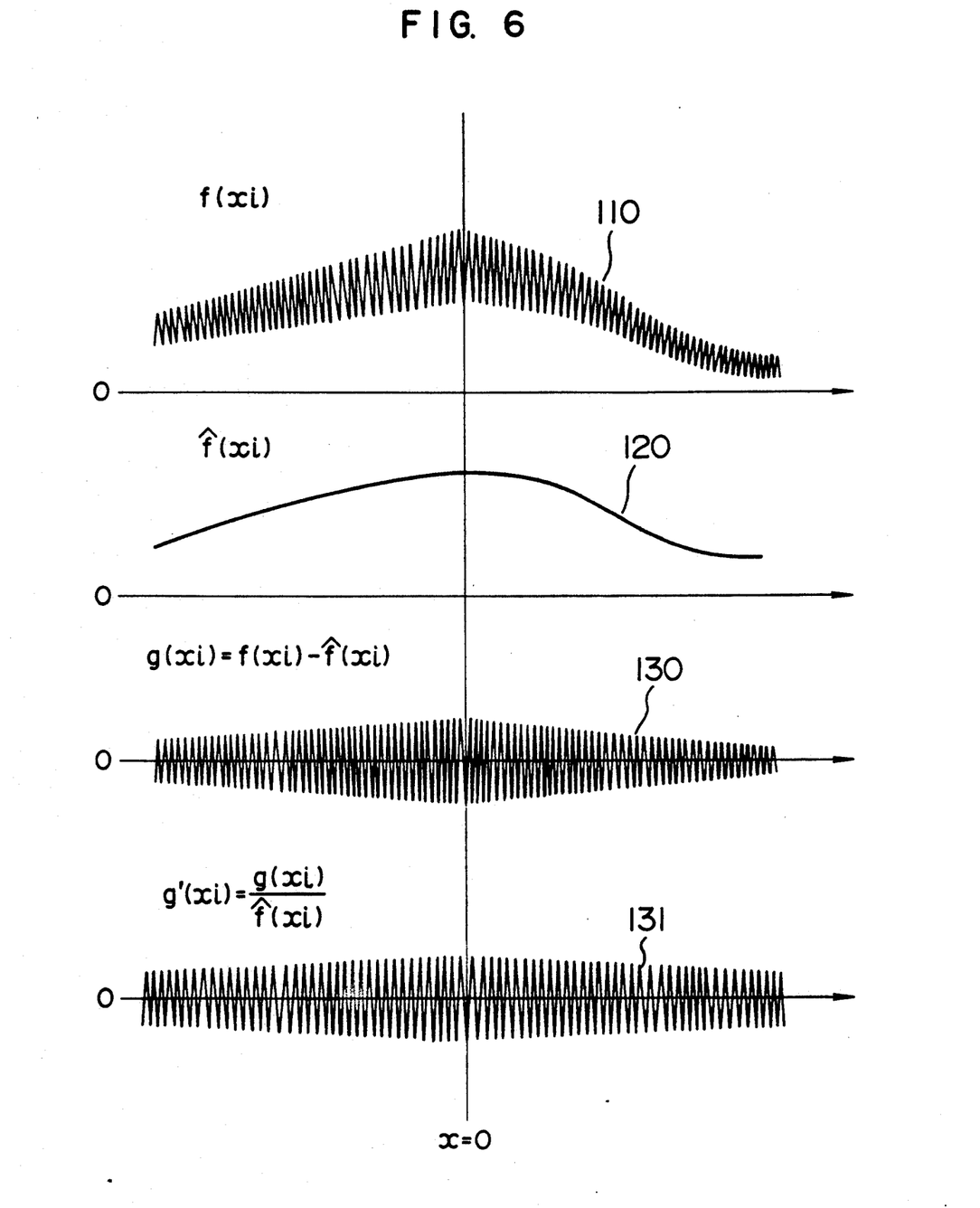
FIG. 6 shows signal waveforms before and after data processing for the embodiment indicated in FIG. 5.

Another embodiment is indicated by a data flow chart in FIG. 5. The feature of this embodiment consists in that the interferogram 130 is divided by the smoothed data 120, which is the extracted DC component, by means of a division processing 165. The left and right unbalance with respect to the level in the interferogram is corrected by this division processing to produce an interferogram, which is approximately symmetric left and right and which has amplified edge portions. This is called a background correction. That is, as indicated in FIG. 6, in the case where a measured signal 110, which is unbalanced left and right because of a left and right asymmetry of the optical system, when an interferogram 130 obtained by a data processing flow identical to that indicated in FIG. 4 is divided by the smoothed data 120, an interferogram 131, which is approximately symmetric left and right with respect to the level and which has amplified edge portions, can be obtained. The background correction is for correcting distortions due to the optical system.

By using a mathematical formula, interferogram 131 can be expressed by:

$$g'(x_i) = g(x_i)/\hat{f}(x_i) \tag{7}$$

Thus it is possible to shape a signal, for which the background has a local asymmetric intensity distribution at the light receiving surface of the photo-diode array 30, e.g. a part of the interference fringes is unreasonably too strong or too weak. This result is subjected to a multiplication processing 145, similarly to that indicated in FIG. 4, to correct for the inter-element sensitivity difference and outputted to a Fourier transform processing 155. The intensity distribution of the background indicated in (b) of FIG. 3 is high at the central portion and low at the peripheral portion and is multiplied by a kind of apodization (window function) in an analog manner. However, theoretically, a correct apodization should be executed after having effected a background correction, in order to maintain the symmetry of the interferogram.

Figure 7:
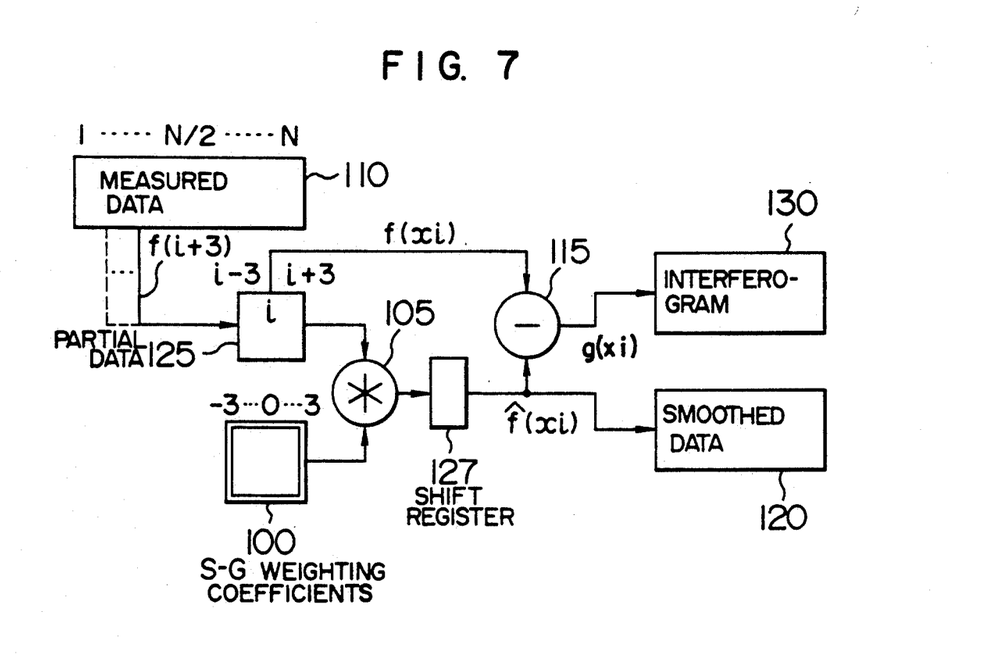
FIG. 7 is a scheme illustrating a part of the data processing in detail.
Figure 8:
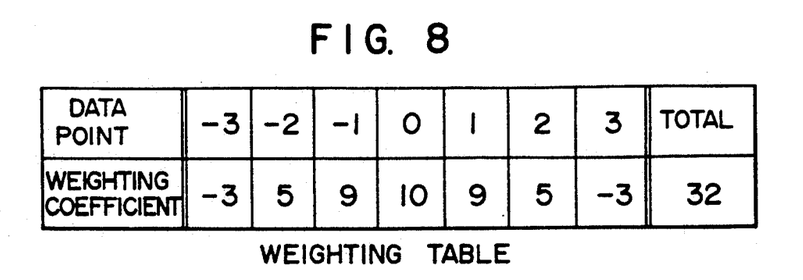
FIG. 8 shows an example of a 7-point weighting table.

FIG. 7 indicates a concrete method for calculating the smoothed data and the interferogram, starting from the measured data. Consider now a case where the measured data 110 are given in a time-sequential form $f(x_1), f(x_2), \ldots, f(x_n)$. It is supposed that the 7 values in the table indicated in FIG. 8 are maintained and 7 elements of data, which are to be subjected to the moving average processing, are stored as partial data 125.

The partial data $f(x_{i-3}) \ldots f(x_i) \ldots f(x_{i+3})$ are multiplied by values of corresponding weighting coefficient points $W(-3) \ldots W(0) \ldots W(3)$, respectively, and the total sum thereof is calculated to be stored in a shift register 127. Here a shift towards right by 5 bits (i.e. 1/32) is performed and normalized smoothed values $f(x_i)$ are calculated. When they are outputted one after another, the smoothed data 120 are obtained. The differences $g(x_i)$ from the value $f(x_i)$ at the centerpoint of the partial data are stored as a one-dimensional array in the memory device 60 indicated in FIG. 1 and used for the following data processing as needed.

Figure 9:
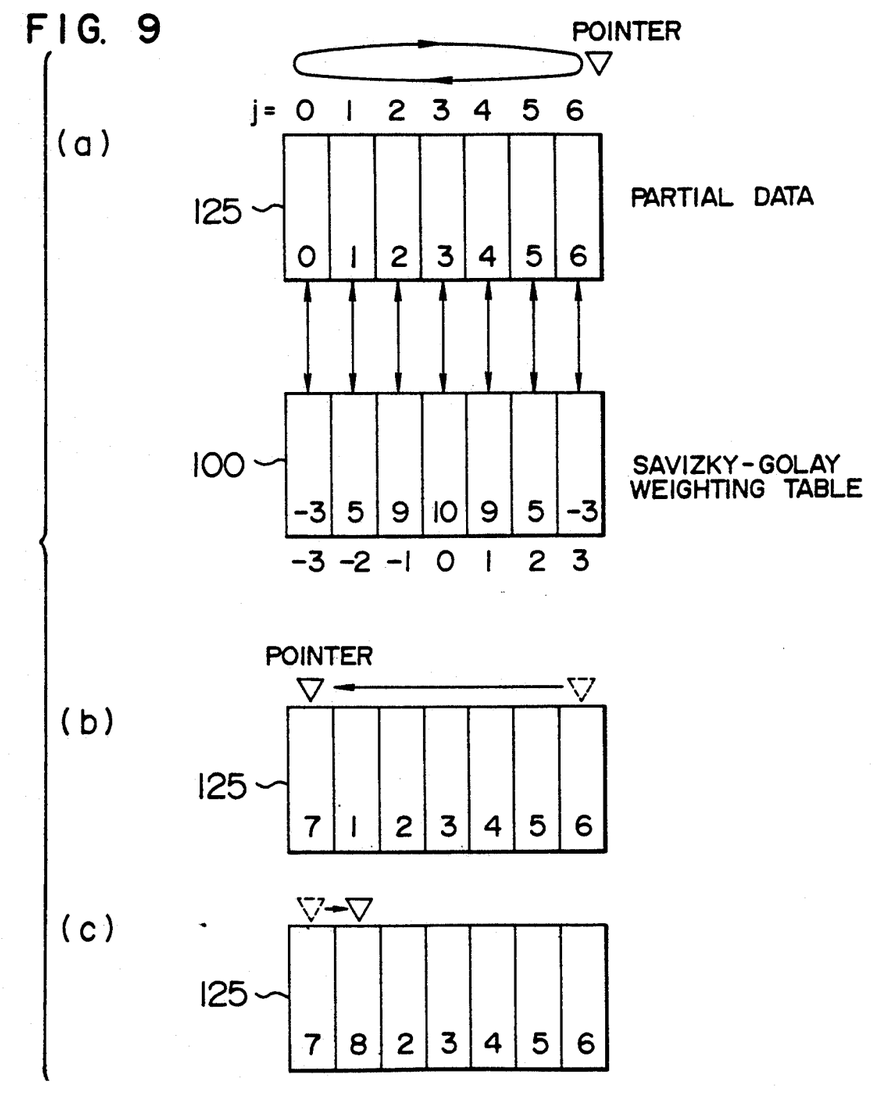
FIG. 9 shows a concrete example of a method for storing partial data.

FIG. 9 indicates a method for storing the partial data 125 in detail. Here it is supposed that the measured data are stored successively in the RAM, starting from the address 0. The 0-th to the sixth elements of the data for the first moving average are taken-in as the partial data, which are multiplied by the Savizky-Golay's weighting coefficients and a first value at the center point is obtained.

Next, as indicated in (b), when the pointer is moved from the point of j=6 in (a) to the point of j=0, the 7-th element of the data is taken-in in lieu of the 0-th element of the data and in this state a second value at the center point is obtained.

Then, as indicated in (c), when the pointer is moved from the point of j=0 to the point of j=1, the 8-th element of the data is taken-in in lieu of the 1st element of the data and in this state a third value at the center point is obtained.

In this way new elements of the data are taken-in one after another in addresses indicated by the pointer and moving average values are obtained successively.

In this case, in order to move repeatedly the pointer as 0, ... 6, 0, ... 6, 0, ... the pointer method is suitable, by which the number of elements in the data is divided by 7, the residual being the pointer number.

This operation method is written generally as D mod W. In this embodiment D represents the number of elements in the data and W the number of elements of the weighting coefficients. In the case where the 8-th element in the data is taken-in, this is expressed by 8 mod 7, which means 8÷7=1 residual 1. The residual 1 indicates the position of the pointer of j=1.

We claim:

1. A method for obtaining a spectrogram of a light source, comprising the steps of:
   receiving light from a light source;
   producing interference fringes from the received light;
   imaging the produced interference fringes;
   transforming the imaged interference fringes into a single set of electric signals; and
   processing only the single set of electric signals to obtain a spectrogram of the light source;
   wherein the processing step includes the steps of:
   digitizing said single set of electric signals and storing the digitized single set of electric signals as a group of consecutive data points;
   obtaining moving average values of said data points, wherein said moving average values represent a DC component of said data points;
   obtaining differences between said moving average values and values of said data points; and
   Fourier-transforming said differences to obtain said spectrogram of said light source.

2. The method according to claim 1, wherein said step of transforming includes the step of transforming said imaged interference fringes into said single set of electric signals with photo-sensors, and wherein said step of Fourier-transforming includes the step of correcting errors in said differences due to sensitivity differences among said photo-sensors.

3. The method according to claim 2, wherein said step of correcting errors includes the steps of:
   obtaining inverse values of outputs of said photo-sensors when said photo-sensors are irradiated with light having a uniform illuminance distribution; and
   multiplying said inverse values by said differences and by an apodization function.

4. A method for obtaining a spectrogram of a light source, comprising the steps of:
   receiving light from a light source;
   producing interference fringes from the received light;
   imaging the produced interference fringes;
   transforming the imaged interference fringes into a single set of electric signals; and
   processing only the single set of electric signals to obtain a spectrogram of the light source;
   wherein the processing step includes the steps of:
   digitizing said single set of electric signals and storing the digitized single set of electric signals as a group of consecutive data points;
   obtaining moving average values of said data points, wherein said moving average values represent a DC component of said data points;
   obtaining differences between said moving average values and values of said data points;
   dividing said differences by said moving average values to obtain divided differences; and
   Fourier-transforming said divided differences to obtain said spectrogram of said light source.

5. The method according to claim 4, wherein said step of transforming includes the step of transforming said imaged interference fringes into said single set of electric signals with photo-sensors, and wherein said step of Fourier-transforming includes the step of correcting errors in said divided differences due to sensitivity differences among said photo-sensors.

6. The method according to claim 5, wherein said step of correcting errors includes the steps of:
   obtaining inverse values of outputs of said photo-sensors when said photo-sensors are irradiated with light having a uniform illuminance distribution; and
   multiplying said inverse values by said divided differences and by an apodization function.

7. A device for obtaining a spectrogram of a light source, comprising:
   means for receiving light from a light source;
   means responsive to the receiving means for producing interference fringes from the received light;
   means responsive to the producing means for imaging the produced interference fringes;
   means responsive to the imaging means for transforming the imaged interference fringes into a single set of electric signals; and
   means responsive to the transforming means for processing only the single set of electric signals to obtain a spectrogram of the light source;
   wherein the processing means includes:
   means responsive to said transforming means for digitizing said single set of electric signals and for storing the digitized single set of electric signals as a group of consecutive data points;
   means responsive to said digitizing and storing means for obtaining moving average values of said data points, wherein said moving average values represent a DC component of said data points;

means responsive to said moving average values obtaining means for obtaining differences between said moving average values and values of said data points; and means responsive to said differences obtaining means for Fourier-transforming said differences to obtain said spectrogram of said light source.

8. The device according to claim 7, wherein said means for transforming includes photo-sensors for transforming said imaged interference fringes into said single set of electric signals, and wherein said means for Fourier-transforming includes means for correcting errors in said differences due to sensitivity differences among said photo-sensors.

9. The device according to claim 8, wherein said means for correcting errors includes:

means for obtaining inverse values of outputs of said photo-sensors when said photo-sensors are irradiated with light having a uniform illuminance distribution; and means responsive to said inverse values obtaining means for multiplying said inverse values by said differences and by an apodization function.

10. A device for obtaining a spectrogram of a light source, comprising:

means for receiving light from a light source;

means responsive to the receiving means for producing interference fringes from the received light;

means responsive to the producing means for imaging the produced interference fringes;

means responsive to the imaging means for transforming the imaged interference fringes into a single set of electric signals; and means responsive to the transforming means for processing only the single set of electric signals to obtain a spectrogram of the light source;

wherein the processing means includes:

means responsive to said transforming means for digitizing said single set of electric signals and for storing the digitized single set of electric signals as a group of consecutive data points;

means responsive to said digitizing and storing means for obtaining moving average values of said data points, wherein said moving average values represent a DC component of said data points;

means responsive to said moving average values obtaining means for obtaining differences between said moving average values and values of said data points;

means responsive to said moving average values obtaining means and to said differences obtaining means for dividing said differences by said moving average values to obtain divided differences; and means responsive to said divided differences obtaining means for Fourier-transforming said divided differences to obtain said spectrogram of said light source.

11. The device according to claim 10, wherein said means for transforming includes photo-sensors for transforming said imaged interference fringes into said single set of electric signals, and wherein said means for Fourier-transforming includes means for correcting errors in said divided differences due to sensitivity differences among said photo-sensors.

12. The device according to claim 11, wherein said means for correcting errors includes:

means for obtaining inverse values of outputs of said photo-sensors when said photo-sensors are irradiated with light having a uniform illuminance distribution; and means responsive to said inverse values obtaining means for multiplying said inverse values by said divided differences and by an apodization function.

13. A method for obtaining a spectrogram of a light source, comprising the steps of:

receiving light from a light source;

producing interference fringes from the received light;

imaging the produced interference fringes;

transforming the imaged interference fringes into a single set of electric signals obtained during a single transforming cycle; and processing only the single set of electric signals to obtain a spectrogram of the light source.

14. The method according to claim 13, wherein the single set of electric signals includes a DC component, and wherein the processing step includes the step of removing the DC component from the single set of electric signals by processing only the single set of electric signals such that the obtained spectrogram of the light source is unaffected by the DC component of the single set of electric signals.

15. A method for obtaining a spectrogram of a light source, comprising the steps of:

receiving light from a light source;

producing interference fringes from the received light;

imaging the produced interference fringes;

transforming the imaged interference fringes into a single set of electric signals; and processing only the single set of electric signals to obtain a spectrogram of the light source;

wherein the transforming step includes the steps of directing the imaged interference fringes onto a scannable array of photo-sensors, and scanning the scannable array of photo-sensors only once to transform the imaged interference fringes into the single set of electric signals.

16. A device for obtaining a spectrogram of a light source, comprising:

means for receiving light from a light source;

means responsive to the receiving means for producing interference fringes from the received light;

means responsive to the producing means for imaging the produced interference fringes;

means responsive to the imaging means for transforming the imaged interference fringes into a single set of electric signals obtained during a single transforming cycle; and means responsive to the transforming means for processing only the single set of electric signals to obtain a spectrogram of the light source;

17. The device according to claim 16, wherein the single set of electric signals includes a DC component, and wherein the processing means includes means for removing the DC component from the single set of electric signals by processing only the single set of electric signals such that the obtained spectrogram of the light source is unaffected by the DC component of the single set of electric signals.

18. A device for obtaining a spectrogram of a light source, comprising:

means for receiving light from a light source;

means responsive to the receiving means for producing interference fringes from the received light;

means responsive to the producing means for imaging the produced interference fringes;

means responsive to the imaging means for transforming the imaged interference fringes into a single set of electric signals; and means responsive to the transforming means for processing only the single set of electric signals to obtain a spectrogram of the light source;

wherein the transforming means includes a scannable array of photo-sensors onto which the imaged interference fringes are directed by the imaging means, and means for scanning the scannable array of photo-sensors only once to transform the imaged interference fringes into the single set of electric signals.

19. A method for converting light from a light source into a spectrogram of the light source, comprising the steps of:

converting light from a light source into collimated light with a collimating lens;

converting the collimated light into interference fringes with a polarizer, a Wollaston prism, and an analyzer operatively arranged to produce interference fringes;

converting the interference fringes into imaged interference fringes with a focusing lens;

converting the imaged interference fringes into a single set of electric signals with an array of photo-diodes; and converting only the single set of electric signals into a spectrogram of the light source.

20. The method according to claim 19, wherein the step of converting only the single set of electric signals into a spectrogram of the light source includes the steps of:

digitizing the single set of electric signals and storing the digitized single set of electric signals as a group of consecutive data points;

obtaining moving average values of the data points, wherein the moving average values represent a DC component of the data points;

obtaining differences between the moving average values and values of the data points; and Fourier-transforming the differences to obtain the spectrogram of the light source.

21. The method according to claim 20, wherein the step of Fourier-transforming includes the step of correcting errors in the differences due to sensitivity differences among the photo-diodes in the array.

22. The method according to claim 21, wherein the step of correcting errors includes the steps of:

obtaining inverse values of outputs of the photo-diodes when the photo-diodes are irradiated with light having a uniform illuminance distribution; and multiplying the inverse values by the differences and by an apodization function.

23. The method according to claim 19, wherein the step of converting only the single set of electric signals into a spectrogram of the light source includes the steps of:

digitizing the single set of electric signals and storing the digitized single set of electric signals as a group of consecutive data points;

obtaining moving average values of the data points, wherein the moving average values represent a DC component of the data points;

obtaining differences between the moving average values and values of the data points;

dividing the differences by the moving average values to obtain divided differences; and Fourier-transforming the divided differences to obtain the spectrogram of the light source.

24. The method according to claim 23, wherein the step of Fourier-transforming includes the step of correcting errors in the divided differences due to sensitivity differences among the photo-diodes in the array.

25. The method according to claim 24, wherein the step of correcting errors includes the steps of:

obtaining inverse values of outputs of the photo-diodes when the photo-diodes are irradiated with light having a uniform illuminance distribution; and multiplying the inverse values by the divided differences and by an apodization function.

26. The method according to claim 19, wherein the single set of electric signals includes a DC component, and wherein the step of converting only the single set of electric signals into a spectrogram of the light source includes the steps of:

obtaining the DC component from only the single set of electric signals; and removing the DC component from the single set of electric signals such that the obtained spectrogram of the light source is unaffected by the DC component.

27. The method according to claim 19, wherein the step of converting the imaged interference fringes into a single set of electric signals includes the step of scanning the photo-diodes in the array only once to convert the imaged interference fringes into the single set of electric signals.

28. A device for converting light from a light source into a spectrogram of the light source, comprising:

a collimating lens for converting light from a light source into collimated light;

a polarizer, a Wollaston prism, and an analyzer operatively arranged to produce interference fringes for converting the collimated light into interference fringes;

a focusing lens for converting the interference fringes into imaged interference fringes;

an array of photo-diodes for converting the imaged interference fringes into a single set of electric signals; and converting means for converting only the single set of electric signals into a spectrogram of the light source.

29. The device according to claim 28, wherein the converting means includes:

means for digitizing the single set of electric signals and storing the digitized single set of electric signals as a group of consecutive data points;

means for obtaining moving average values of the data points, wherein the moving average values represent a DC component of the data points;

means for obtaining differences between the moving average values and values of the data points; and means for Fourier-transforming the differences to obtain the spectrogram of the light source.

30. The device according to claim 29, wherein the means for Fourier-transforming includes means for correcting errors in the differences due to sensitivity differences among the photo-diodes in the array.

31. The device according to claim 30, wherein the means for correcting errors includes:

means for obtaining inverse values of outputs of the photo-diodes when the photo-diodes are irradiated with light having a uniform illuminance distribution; and means for multiplying the inverse values by the differences and by an apodization function.

32. The device according to claim 28, wherein the converting means includes:

means for digitizing the single set of electric signals and storing the digitized single set of electric signals as a group of consecutive data points;

means for obtaining moving average values of the data points, wherein the moving average values represent a DC component of the data points;

means for obtaining differences between the moving average values and values of the data points;

means for dividing the differences by the moving average values to obtain divided differences; and means for Fourier-transforming the divided differences to obtain the spectrogram of the light source.

33. The device according to claim 32, wherein the means for Fourier-transforming includes means for correcting errors in the divided differences due to sensitivity differences among the photo-diodes in the array.

34. The device according to claim 33, wherein the means for correcting errors includes:

means for obtaining inverse values of outputs of the photo-diodes when the photo-diodes are irradiated with light having a uniform illuminance distribution; and means for multiplying the inverse values by the divided differences and by an apodization function.

35. The device according to claim 28, wherein the single set of electric signals includes a DC component, and wherein the converting means includes:

means for obtaining the DC component from only the single set of electric signals; and means for removing the DC component from the single set of electric signals such that the obtained spectrogram of the light source is unaffected by the DC component.

36. The device according to claim 28, wherein the array of photo-diodes includes means for scanning the photo-diodes only once to convert the imaged interference fringes into the single set of electric signals.

* * * * *